US009963247B2

(12) United States Patent
Boyer et al.

(10) Patent No.: US 9,963,247 B2
(45) Date of Patent: May 8, 2018

(54) METHOD AND SYSTEM FOR AUTOMATIC DETERMINATION OF AN OPTIMIZED DESCENT AND APPROACH PROFILE FOR AN AIRCRAFT

(71) Applicant: THALES, Courbevoie (FR)

(72) Inventors: Johan Boyer, Toulouse (FR); Benoît Dacre-Wright, Toulouse (FR)

(73) Assignee: THALES, Courbevoie (FR)

(*) Notice: Subject to any disclaimer, the term of this patent is extended or adjusted under 35 U.S.C. 154(b) by 0 days. days.

(21) Appl. No.: 15/176,003

(22) Filed: Jun. 7, 2016

(65) Prior Publication Data
US 2016/0362194 A1 Dec. 15, 2016

(30) Foreign Application Priority Data
Jun. 12, 2015 (FR) ..................... 15 01219

(51) Int. Cl.
*B64F 1/18* (2006.01)
*B64C 19/00* (2006.01)
*G05D 1/00* (2006.01)
*G05D 1/06* (2006.01)
*G08G 5/00* (2006.01)
*G08G 5/02* (2006.01)

(52) U.S. Cl.
CPC ................ *B64F 1/18* (2013.01); *B64C 19/00* (2013.01); *G05D 1/0005* (2013.01); *G05D 1/0676* (2013.01); *G08G 5/0021* (2013.01); *G08G 5/025* (2013.01); *G08G 5/0034* (2013.01); *Y02T 50/84* (2013.01)

(58) Field of Classification Search
None
See application file for complete search history.

(56) References Cited

U.S. PATENT DOCUMENTS

| 9,330,574 | B1* | 5/2016 | Young | G08G 5/003 |
| 2006/0265110 | A1* | 11/2006 | Ferro | G01C 23/00 701/3 |
| 2012/0277936 | A1* | 11/2012 | Kumar | G05D 1/0676 701/16 |
| 2013/0204470 | A1 | 8/2013 | Luckner et al. | |
| 2014/0336932 | A1* | 11/2014 | Leones | G08G 5/003 701/528 |
| 2014/0343766 | A1* | 11/2014 | Le Gall | B64D 45/04 701/18 |

FOREIGN PATENT DOCUMENTS

FR   3 005 759 A1   11/2014
FR   3 014 213 A1   6/2015

* cited by examiner

*Primary Examiner* — Tamara L Weber
(74) *Attorney, Agent, or Firm* — Baker & Hostetler LLP

(57) ABSTRACT

A method of automatic determination of a descent and approach profile for an aircraft is based on a backward computation of propagation of a state of the aircraft along segments S(i) from a backward computation start point to the start point DECEL of onset of the deceleration of the aircraft. The method of automatic determination comprises for each segment S(i) a step of determining an optimal speed $V_{OPT}(i)$ of the aircraft over the range of speeds of the next aerodynamic configuration C(j+1) to be implemented as a function of a predetermined deceleration strategy and/or of predetermined constraints inherent in the flight procedure or introduced by the pilot in his flight plan.

15 Claims, 7 Drawing Sheets

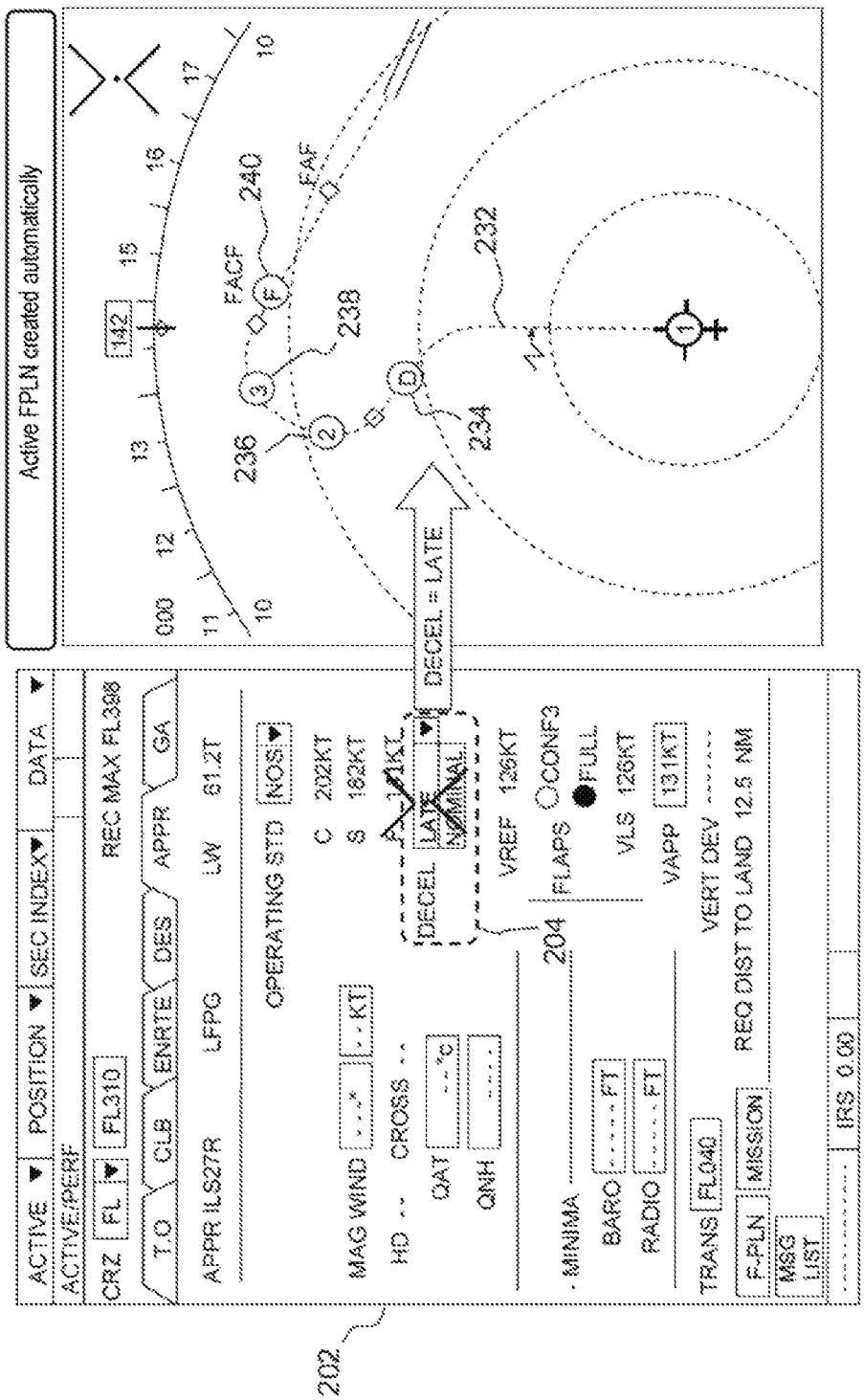

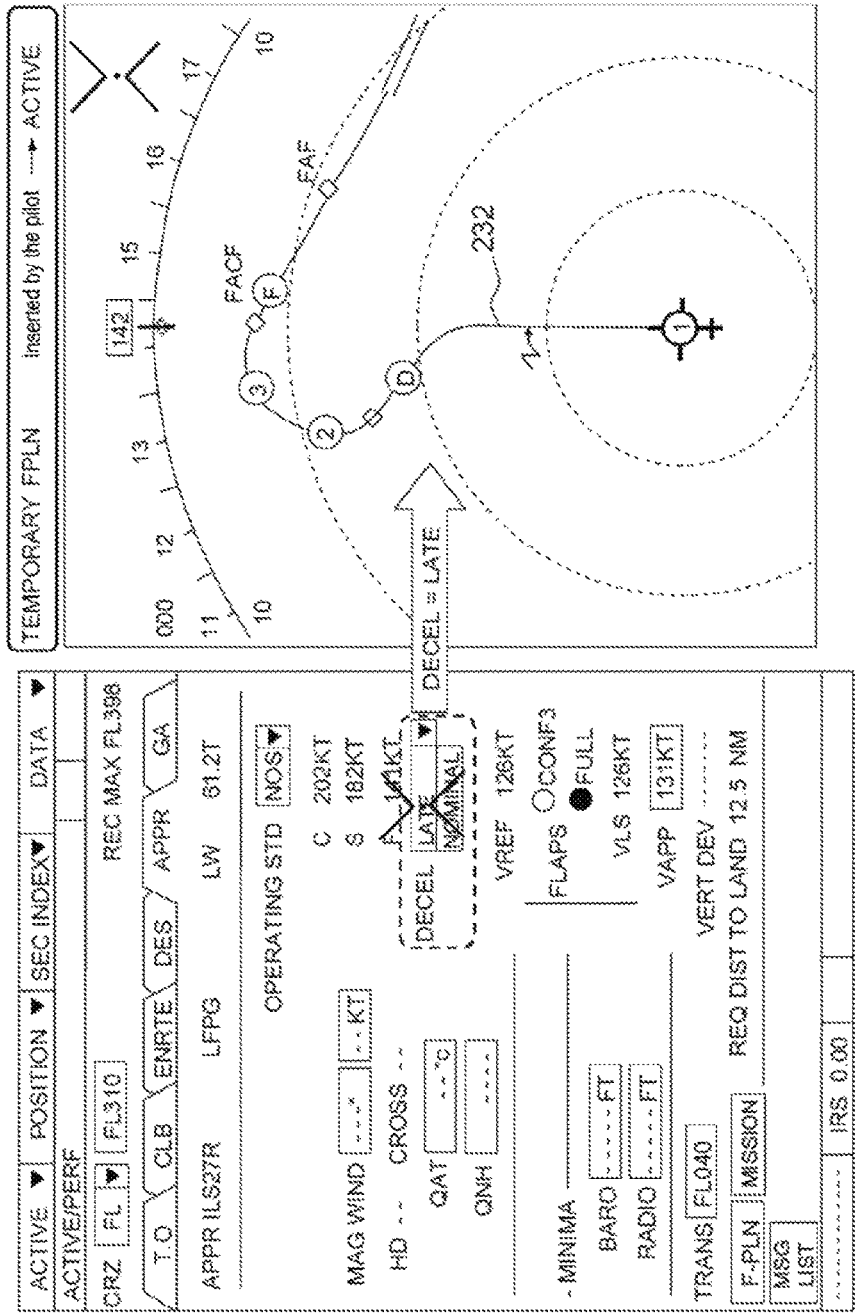

METHOD AND SYSTEM FOR AUTOMATIC DETERMINATION OF AN OPTIMIZED DESCENT AND APPROACH PROFILE FOR AN AIRCRAFT

CROSS-REFERENCE TO RELATED APPLICATIONS

This application claims priority to foreign French patent application No. FR 1501219, filed on Jun. 12, 2015, the disclosures of which are incorporated by reference in their entirety.

FIELD OF THE INVENTION

The present invention relates to a method of automatic determination of an approach profile optimizing the management of the aerodynamic configuration of an aircraft.

The present invention also relates to a system, configured to implement the method of automatic determination of an approach profile optimizing the management of the aerodynamic configuration of the aircraft.

The present invention also relates to means for displaying and/or for inputting input parameters of the method of automatic determination.

The present invention also relates to means for displaying the approach profile determined by the method of automatic determination and optimizing the management of the aerodynamic configuration of the aircraft.

BACKGROUND

Today, civil aeroplanes determine their vertical descent profile with the help of navigation databases, data entered into the active flight plan and performance data for the aeroplane. The vertical profile is established by the Flight Management System FMS which computes the trajectory associated with the performance of the aircraft allowing best compliance with the operational constraints.

The predicted vertical descent and approach profile, considers certain assumptions about the instants of extension of the actuators influencing the deceleration of the aircraft, namely the slats, the flaps, the landing gear and the airbrakes, these instants also being termed subsequently the instants of setup of aerodynamic configurations.

Today, these instants of setup of aerodynamic configurations are defined by speeds provided directly by a performance database. The speeds conventionally used are the maneuvering speeds, that is to say the minimum speeds of setup of configuration in automatic management mode. These instants therefore do not vary except for the airbrakes which depend on the performance of the aeroplane and slopes predicted. This means that these instants take account neither of the actual meteorological conditions, nor of the procedure. These instants are nevertheless essential for the computation of the deceleration profile, of the flight time, of the fuel consumption and of the noise level perceived on the ground.

For example, the slats and flaps are extended at the maneuvering speeds, otherwise called F/S/O respectively for the aerodynamic configuration termed FULL (or 3) in which the slats and flaps are extended to a high degree, termed landing, the aerodynamic configuration termed 2 in which the slats and the flaps are extended to a lesser degree, and the configuration termed 1. These speeds are the minimum speeds Vmin at which the aerodynamic configurations can be extended when the aeroplane is in automatic management mode by the flight management system FMS. Moreover, the maximum speeds of setup of configuration Vmax are called the VFEs and ensure that the loads on the wings remain acceptable. These latter speeds are provided to the pilots in the cockpit.

Moreover, the vertical slopes of the current procedures are often frozen for simplifying reasons (computation of geometric profile relying on the altitude constraints of the procedure for example).

In the current economic and ecological context, airlines are seeking to reduce the operational costs of flights as well as to reduce their environmental footprint, that is to say to decrease environmental nuisance such as noise or emissions of greenhouse effect gases through reductions in fuel consumption.

To achieve these objectives, new approach procedures (lesser noise—no holding pattern) of CDA (Continuous Descent Approach)/CDO (Continuous Descent Operations) type are proposed. They must at one and the same time afford environmental benefits and ensure better determinism especially as regards the predicted end time of the procedure in respect of problems of flow separation on approach by the air traffic control.

Generally, the so-called CDA/CDO flight procedures consist in flying higher with a neutral energy profile, that is to say with a minimum thrust, without using the airbrakes, and with instants of setup of configuration that are optimized in regard to the energy stabilization and sound nuisance.

Thus the implementation of CDA/CDO procedures leads to constructions of very optimized vertical profiles where the room for manoeuvre to rejoin the vertical plan in case of deviation is reduced.

Taking account of this problematic issue, the instants of extension of the slats and flaps therefore play a major role in computing the descent and approach profiles in the field of so-called CDA/CDO flight procedures.

However, current solutions for which the choice of the configuration change speeds is fixed at a single value, are very conservative in this regard, and do not support the reduction of operational costs as one of the objectives fixed by the said CDA/CDO procedures. In particular, the current solutions lead to higher fuel consumption.

Moreover, fixing configuration change speeds at a single value amounts to fixing the deceleration profile and does not make it possible to adjust it as a function of the speed constraints to be satisfied.

Furthermore, current solutions do not correspond to the operational practices of pilots, thus not allowing reliable and precise prediction of fuel consumption and flight time up to landing.

Generally speaking, no adaptive scheme exists today which makes it possible to adapt the speeds of setup of configuration for each flight, according to the particularities of the procedures, of the meteorological conditions, of the constraints of speeds, time, noise and other parameters, even though patent application FR 3005759 A1 describes a method of automatic determination of an optimized descent and approach profile which makes it possible to modify the instants of setup of configuration so as to circumvent non-flyable slope problems. However, the method described does not make it possible to deal with the optimization of the setups of aerodynamic configurations in a more extensive and more complex set of contexts.

The adjustment of the setups of configurations is a major element in adapting the trajectory of the aeroplane and its speed profile to the various operational constraints. However, today, simplified modelling of the sequence for setup of aerodynamic configurations whose instants are generally based on fixed and minimum speeds, does not make it possible to cover the variability of the operational procedures, termed "Dive and Drive" or "CDA/CDO", and consequently does not represent the current practices of pilots.

The technical problem is to provide a method of automatic determination of an optimized descent and approach profile for an aircraft making it possible to compute speeds of setup of optimized configurations and correspondingly the instants of change of aerodynamic configurations, by considering the loads on the wings and the structure, the maneuvering speeds, the procedure (constraints of speeds, time, noise, slope) and the operational costs (fuel consumption, noise).

The technical problem is to provide a method of automatic determination of an optimized descent and approach profile for an aircraft which allows the pilot to have the choice of an advanced or late deceleration according to customary practices while guaranteeing a sufficient deceleration capacity for the stabilization of the aircraft at 1000 ft AGL (Above Ground Level) under IFR (Instrument Flight Rule) or 500 ft AGL under VFR (Visual Flight Rule).

SUMMARY OF THE INVENTION

For this purpose, the subject of the invention is a method of automatic determination of a descent and approach profile for an aircraft, implemented on the basis of a flight management system based on one or more electronic computers, the descent and approach profile evolving from a start point DECEL of onset of the deceleration of the aircraft to a stabilization point, comprising a sequence of segments defined between successive characteristic points some of which are aerodynamic configuration change points, the configurations being taken from among a discrete set of predetermined aerodynamic configurations; the method of automatic determination being based on a backward computation for propagating a state of the aircraft along the segments of the sequence from the stabilization point to the start point DECEL of the onset of the deceleration of the aircraft; and the method of automatic determination comprising for each current segment S(i) covered in the profile, delimited between an associated current start characteristic point SP(i) of the backward computation and an associated current arrival characteristic point SP(i+1) of the backward computation:

a step of determining one or more next aerodynamic configurations C(j+1) of the aircraft on the basis of a current configuration C(j) active at the current start characteristic point SP(i) of the backward computation and of a nominal sequence of change of aerodynamic configurations; and a step of determining and providing for the next aerodynamic configuration or configurations (Cj+1) a range of speeds of possible use of the said next aerodynamic configuration C(j+1), delimited by a minimum speed $V_{min}(j+1)$ and a maximum speed $V_{max}(j+1)$;

the method of automatic determination being characterized in that it comprises for each current segment covered S(i), a step of determining an optimal speed $V_{OPT}(i)$ of the aircraft over the range of speeds of the next aerodynamic configuration C(j+1), the said optimal speed $V_{OPT}(i)$ of the aircraft being dependent on a predetermined deceleration strategy and/or on predetermined constraints inherent in the flight procedure or introduced by the pilot in his flight plan.

According to particular embodiments, the method of automatic determination comprises one or more of the following characteristics:

the deceleration strategy is a single-criterion optimization strategy which minimizes a parameter taken from among a fuel consumption by the aircraft, a level of acoustic noise generated by the aircraft, a travel time, or a multi-criterion optimization strategy which optimizes a combination of several criteria, at least one of them being included in the set made up of a fuel consumption, an acoustic noise level and a travel time;

the predetermined constraints inherent in the flight procedure or introduced by the pilot in his flight plan are included in the set of the constraints made up of: constraints of speed reached at a characteristic point of a segment that are greater than or equal to a predetermined threshold value (AT OR ABOVE), or equal to a predetermined threshold value (AT), or less than or equal to a predetermined threshold value (AT OR BELOW), or included in a window of predetermined speeds (WINDOW); and constraints of arrival time at a characteristic point of a segment that are greater than or equal to a predetermined threshold value (AT OR AFTER), or equal to a predetermined threshold value (AT), or less than or equal to a predetermined threshold value (AT OR BEFORE), or included in a predetermined time window (WINDOW); and noise constraints complied with on the basis of a characteristic point of a segment; and constraints of altitude reached at a characteristic end point of a segment that are greater than or equal to a predetermined threshold value (AT OR ABOVE), or equal to a predetermined threshold value (AT), or less than or equal to a predetermined threshold value (AT OR BELOW), or included in a predetermined window of altitude (WINDOW); and fuel consumption constraints;

the method of automatic determination furthermore comprises for each current segment S(i) covered, a step of numerical integration of the said segment S(i), making it possible to propagate the state of the aeroplane along the current segment S(i) from the associated current start characteristic point SP(i) of the backward computation to the associated current arrival characteristic point SP(i+1) of the backward computation, and carried out as a function of the type of the current segment S(i), defined by the sequencer, and of a termination condition, defined by either reaching the optimal speed of the aircraft in the current segment, or reaching the associated current backward computation arrival characteristic point without having reached the optimal speed of the aircraft;

the type of segment is included in the set made up of: the segment of FPA (Flight Path Angle) type consisting in fixing a slope with respect to the ground; and the segment of OPEN type consisting in fixing an engine rating; and the segment of VS type consisting in fixing a vertical speed; and the segment of LEVEL type consisting in fixing an altitude; the segments of FPA, OPEN, VS, LEVEL type being able to be implemented by choice in decelerated mode, in constant-speed mode or in accelerated mode;

the method of automatic determination comprises a flyability test step, executed when the optimal speed of the aircraft is reached, consisting in: determining a limit slope FPAlim associated with the deployment of the new configuration C(j+1) as a maximum slope in absolute value allowing the speed of the aircraft to be maintained under "idle" thrust without airbrake and without acceleration, and comparing the slope of the current segment S(i) with the limit slope FPAlim determined;

when the characteristic point forming the associated current arrival point of the backward computation is reached without having reached the optimal speed of the aircraft, the performance is compared in terms of optimization according to the DECEL strategy chosen between a first solution consisting in advancing the change of aerodynamic configuration at the arrival point of the current segment S(i), and a second solution consisting in not advancing the current change of aerodynamic configuration; and in the case where the performance in terms of optimization according to the chosen DECEL strategy of the first solution is better than that of the second solution, a limit slope FPAlim, associated with the deployment of the new aerodynamic configuration is determined as the maximum slope allowing the speed of the aircraft to be maintained under "idle" thrust without airbrake and without acceleration, then the slope of the current segment S(i) is compared with the limit slope FPAlim;

when the slope of the current segment S(i) is greater than or equal to the limit slope FPAlim on the new nominal configuration forecast, it is sought whether an alternative aerodynamic configuration to the new nominal aerodynamic configuration exists, and if it is determined that a new alternative aerodynamic configuration exists, then for this alternative, the performance is compared in terms of optimization according to the DECEL strategy chosen between a first solution consisting in advancing the change of aerodynamic configuration at the arrival point of the current segment with this alternative, and a second solution consisting in not advancing the current change of aerodynamic configuration; and in the case where for this alternative the performance in terms of optimization according to the chosen DECEL strategy of the first solution is better than that of the second solution, then a limit slope FPAlim associated with the deployment of the new alternative aerodynamic configuration is determined as a maximum slope in absolute value allowing the speed of the aircraft to be maintained under "idle" thrust without airbrake and without acceleration, then the slope of the current segment S(i) is compared with the limit slope FPAlim determined; then in the case where the slope of the current segment S(i) is strictly less than or equal in absolute value to the limit slope FPAlim determined, in a step of modifying the current aerodynamic configuration, the change of current aerodynamic configuration into the new alternative aerodynamic configuration is carried out; and in the case where there does not exist any new alternative aerodynamic configuration for which the slope of the current segment S(i) is strictly less than or equal in absolute value to the limit slope FPAlim determined the current aerodynamic configuration is maintained for the integration of the next segment S(i+1);

when the slope of the current segment S(i) is strictly less than or equal to the limit slope FPAlim for the new aerodynamic configuration C(j+1), in a step of modifying the current aerodynamic configuration, the change of current aerodynamic configuration into the new nominal aerodynamic configuration according to the nominal sequence of the sequencer is carried out;

when the associated current backward computation arrival characteristic point is reached without having reached the optimal speed of the aircraft, the performance is compared in terms of optimization according to the DECEL strategy chosen between a first solution consisting in advancing the change of aerodynamic configuration at the arrival characteristic point of the current segment, and a second solution consisting in not advancing the current change of aerodynamic configuration; and in the case where the performance in terms of optimization according to the chosen DECEL strategy of the second solution is better than that of the first solution, it is sought whether an alternative aerodynamic configuration to the nominal aerodynamic configuration exists, and if it is determined that an alternative aerodynamic configuration exists, for this alternative the performance is compared in terms of optimization according to the DECEL strategy chosen between a first solution consisting in advancing the change of aerodynamic configuration at the arrival point of the current segment with this alternative, and a second solution consisting in not advancing the current change of aerodynamic configuration.

The subject of the invention is also a method of automatic determination of a descent and approach profile for an aircraft, implemented on the basis of a flight management system based on one or more electronic computers, the descent and approach profile evolving from a start point DECEL of onset of the deceleration of the aircraft to a stabilization point, comprising a sequence of horizontal and vertical flight phases passing through successive characteristic points some of which are aerodynamic configuration change points, the configurations being taken from among a discrete set of predetermined aerodynamic configurations C(j); the method of automatic determination being based on a computation of optimized trajectory which directly integrates the coupling of horizontal and vertical flight phases into the flight plan and being characterized in that it comprises:

a step of providing aerodynamic configurations C(j) and of computing for each aerodynamic configuration a range of speeds of possible use of the said aerodynamic configuration, delimited by a minimum speed $V_{min}(j)$ and a maximum speed $V_{max}(j)$; and a step of formulating a problem of computing a global trajectory from the start point DECEL to the stabilization point in the form of an optimal-control problem; and a step of solving the optimal-control problem with a tradeoff between the constraints of use of the aerodynamic configurations so as to determine their optimal sequence, a computation of the characteristic points and a computation of the speeds of setup of configuration $V_{OPT}(j)$ optimized as a function of a predetermined deceleration strategy and/or of predetermined constraints inherent in the flight procedure or introduced by the pilot in his flight plan.

The subject of the invention is also a system for automatic determination of a descent and approach profile for an aircraft comprising a flight management system based on one or more electronic computers, means for inputting data to allow a pilot to enter data into the flight management system, one or more displays for displaying one or more descent profiles of the aircraft, and in which:

the descent and approach profile of the aircraft is forecast to evolve from a start point DECEL of onset of the deceleration of the aircraft to a backward computation start point, and comprises a string of segments defined between successive characteristic points and positions of change of aerodynamic configurations taken from among an integer number of predetermined aerodynamic configurations; and the flight management system (10) is configured to implement a method of automatic determination, based on a backward computation for propagating a state of the aircraft along the segments of the string from the backward computation start point to the start point DECEL of the onset of the deceleration of the aircraft; and implement for each current segment S(i) covered in the profile, delimited between an associated current start characteristic point SP(i) of the backward computation and an associated current arrival characteristic point SP(i+1) of the backward computation, a step of determining one or more next aerodynamic configurations C(j+1) of the aircraft on the basis of a current configuration C(j) active at the current start characteristic point SP(i) of the backward computation and of a nominal sequence of change of aerodynamic configurations; and a step of determining and providing for the next aerodynamic configuration or configurations (Cj+1) a range of possible speeds of use of the said aerodynamic configuration C(j+1), delimited by a minimum speed $V_{min}$ (j+1) and a maximum speed $V_{max}$(j+1);

the system for automatic determination of a descent and approach profile being characterized in that:

the inputting means and the flight management system are configured to leave the choice to the pilot to enter and select a deceleration strategy; and the flight management system is configured to determine for each current segment covered S(i) an optimal speed $V_{OPT}$(j+1) of the aircraft over the range of speeds of the next aerodynamic configuration C(j+1) as a function of the deceleration strategy chosen and/or of predetermined constraints inherent in the flight procedure or introduced by the pilot in his flight plan.

According to particular embodiments, the system for automatic determination comprises one or more of the following characteristics:

the flight management system is configured to provide the pilot through one or more displays with the optimal aerodynamic configuration change speeds and/or the pseudo-waypoints on the predicted trajectory at which to perform the changes of aerodynamic configuration and/or provide an automatic pilot with the optimal aerodynamic configuration change speeds and/or the instants of change of aerodynamic configuration for actuating the corresponding actuator or actuators;

the system for automatic determination of a descent and approach profile for an aircraft furthermore comprises a set of actuators, made up of slats, flaps, airbrakes, a landing gear of the aircraft, for implementing the various aerodynamic configurations allowed by the sequencer; each aerodynamic configuration being characterized by a combination of states of deployment of the actuators from among the slats, the flaps, the airbrakes, the landing gear, the states of deployment of the actuators each being provided by a parameter representative of a first angle made by the slats with a first predetermined direction, of a second angle made by the flaps with a second predetermined direction, of a third angle made by the airbrakes with a third predetermined direction; and of the extended state of the landing gear.

The subject of the invention is also a display of changes of aerodynamic configurations, determined according to the method of automatic determination described hereinabove comprising:

a first screen for displaying a lateral navigation profile and/or a vertical descent profile as altitudes and/or as speeds including each of the pseudo-waypoints at each of which a change of aerodynamic configuration takes place, the geographical positions of the pseudo-waypoints varying as a function of the deceleration strategy chosen; and/or a second screen for displaying a banner of possible speeds of use of a selected aerodynamic configuration and/or of an optimized speed of extension of the aerodynamic configuration corresponding to a choice of deceleration strategy and an entered flight plan.

BRIEF DESCRIPTION OF THE DRAWINGS

The invention will be better understood on reading the description, given solely by way of example, of several embodiments which will follow and while referring to the drawings in which:

FIGS. 4A and 4B are respective views of a display of the inputting of the selection of a deceleration strategy, here delayed, and of a navigation display including aerodynamic configuration change points corresponding to the delayed deceleration strategy selected;

FIGS. 5A and 5B are respective views of a display of the inputting of the validated selection of a deceleration strategy, here delayed, and of a validated navigation display including aerodynamic configuration change points corresponding to the delayed deceleration strategy selected;

DETAILED DESCRIPTION

Generally and conventionally, during flight preparation or during a rerouting, the crew enters its flight plan into a flight management system, commonly called FMS in accordance with the expression "Flight Management System".

In a known manner, on the basis of the flight plan defined by the pilot in the form of a list of waypoints and of procedures relating to departure, the arrival airways, the missions, the lateral trajectory is computed as a function of the geometry of sections between the waypoints (commonly called LEGs) and/or of the altitude and speed conditions which are used for the computation of the turning radius. Over this lateral trajectory, the FMS optimizes a vertical trajectory, complying with possible constraints on altitude, speed, time, slope.

To forecast the behaviour of the aeroplane and thus determine the trajectory, the FMS uses a performance database which make it possible to forecast the behaviour of the aeroplane for a given state.

Conventionally, when the aircraft is an aeroplane, a state of the aircraft called "aircraft state" is defined as the set made up of all the parameters influencing the aeroplane's flight mechanics: in particular the slope, but also thrust, drag, mass, speed, altitude, aerodynamic configuration, etc.

Figure 1:
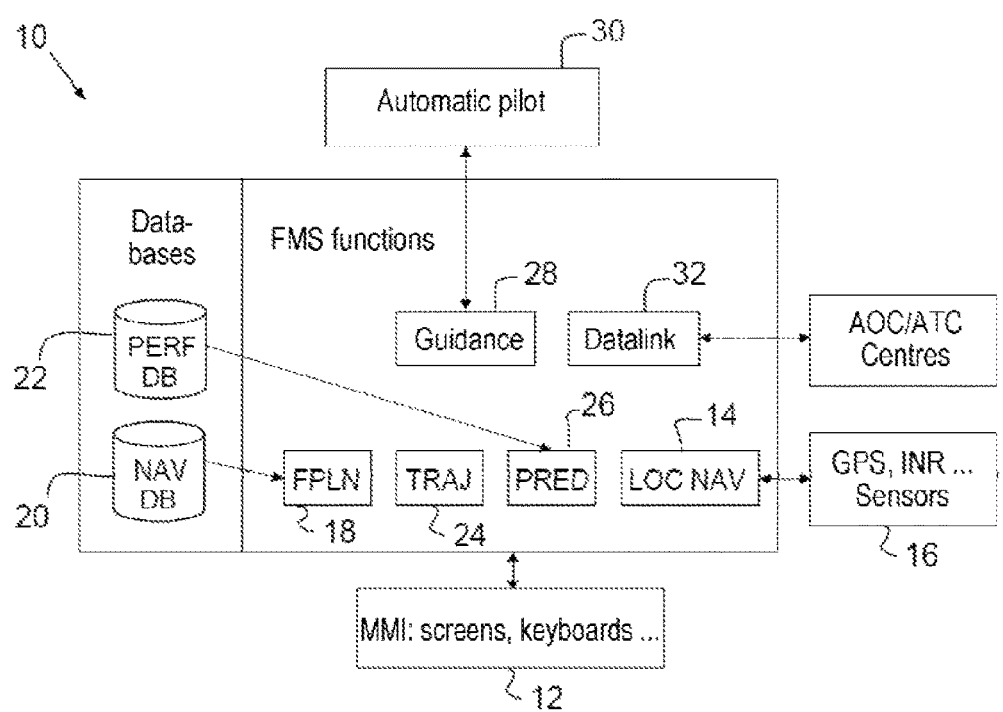
FIG. 1 is a view of a flight management system of FMS type for an aircraft configured to implement the method of automatic determination of the invention.

According to FIG. 1 and a functional representation of a flight management system for an aircraft, a flight management system FMS 10, based on one or more electronic computers, has a man-machine interface 12 comprising inputting means, for example consisting of a keyboard, and display means, for example consisting of a display screen, or else simply a display touchscreen, as well as modules fulfilling the various functions described in the ARINC 702 standard entitled "Advanced Flight Management Computer System", of December 1996. The method according to the invention can be carried out within the framework of a comparable architecture, but not restricted to the latter. The flight management system FMS 10 is configured to implement all or part of the functions of the ARINC 702 standard through the following various modules:

a navigation module 14, termed LOCNAV, for performing optimal location of the aircraft as a function of geo-location means 16 such as satellite based geo-positioning or GPS, GALILEO, VHF (Very High Frequency) radionavigation beacons, inertial platforms. This module communicates with the aforementioned geo-location devices;

a module for determining flight plans 18, termed "FPLN", for inputting the geographical elements constituting the skeleton of the route to be followed, such as the points imposed by the departure and arrival procedures, the waypoints, the airways;

a navigation database 20, termed NAVDB, for constructing geographical routes and procedures with the help of data included in the bases relating to the points, beacons, and to the portions of trajectories, also called "legs" of interception or of altitude, etc.;

a performance database 22, termed PRF DB, containing information relating to the aerodynamic parameters and to the performance of the engines of the aircraft, as well as to its field of use or flight model;

a lateral trajectory determination module 24, termed TRAJ, for constructing a continuous trajectory on the basis of the points of the flight plan, complying with the performance of the aircraft and the confinement constraints (RNP);

a predictions module 26, termed PRED, for constructing an optimized vertical profile on the lateral trajectory, and giving the estimations of distance, time, altitude, speed, fuel and wind especially over each point, at each change of piloting parameter and at each change of destination and which will be displayed to the crew. The functions forming the subject of the invention affect this part of the computer in particular and it should be noted that the modules 24 and 26 can be integrated as a single module TRAJ-PRED which handles the lateral and vertical computations globally;

a guidance module 28, termed GUIDANCE, for guiding the aircraft in the lateral plane and the vertical plane over its three-dimensional trajectory, while complying with the speed, with the aid of the information computed by the predictions module 26. In an aircraft equipped with an automatic piloting device 30, the latter exchanges information with the guidance module 28;

a digital data transport link means 32, termed DATA-LINK, for exchanging flight information between the flight plan module and predictions module and the control centres or other aircraft 34.

Figure 2:
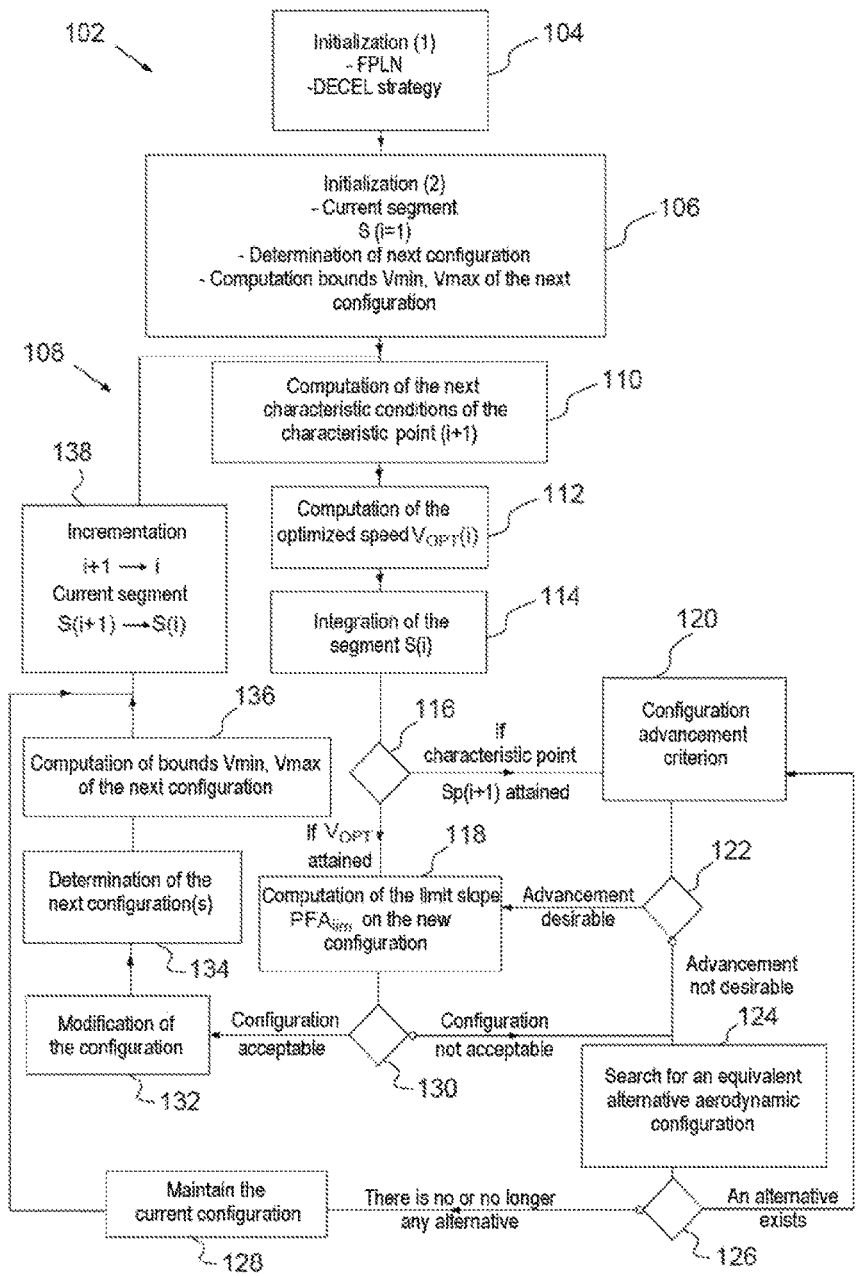
FIG. 2 is a flowchart of a method of automatic determination according to the invention, implemented by the flight management system of FIG. 1.

According to FIG. 2 and a preferred embodiment, a method of automatic determination 102 of an optimized descent and approach profile for an aircraft according to the invention is initialized by the pilot, during the input of a flight plan and the choice of a DECEL strategy.

Generally, the method of automatic determination 102 is based on the computation of the FMS predictions and consists in computing an optimal late deceleration of an aircraft on approach. This computation includes a computation of the, minimum and maximum, achievable speeds of setup of configuration, a computation of the characteristic points of the trajectory and a computation of the optimized speeds of setup of configuration by taking account of the various constraints (fuel, time, noise, loads, etc).

The method of automatic determination 102 relies on a sequencer, which corresponds to a conventional state machine, whose variants are perfectly known to the person skilled in the art. This sequencer defines the sequence of segments to be used and contains a predefined strategy of stringing together integrations of various types of segments. The segments used can convey the various modes of guidance of the aircraft, relying for example on four types of segments. The slope segments, termed FPA (Flight Path Angle), consist in fixing a slope with respect to the ground; the OPEN segments consist in fixing an engine rating; the segments of Vertical Speed, termed VS, consist in fixing a vertical speed; the segments of altitude level or holding patterns, termed LEVEL, consist in fixing an altitude. Each of these four types of segments are split into two categories, the acceleration (or deceleration) segments and the constant CAS or MACH speed segments. The sequencer thus assembles, according to the predefined strategy, these various segments to construct the trajectory of the aircraft on the basis of an initial aircraft state, termed initial "aircraft state". The aircraft state is thus propagated by numerical integration along a segment of given type until one or more of the exit conditions is or are reached, marking the end of the current segment, and the start of a new segment. The exit conditions can be defined by a speed, an altitude and/or a distance according to the type of segment considered. For example, a constant-speed LEVEL segment can only terminate on a distance condition, while a constant-speed FPA segment can terminate on an altitude condition or a distance condition. The final aircraft state at the end of the segment constitutes the initial aircraft state of the following segment, and is thus propagated until the final conditions of the computation are reached.

Variants in terms of acceleration and deceleration can also be used.

Since it involves the definition of an updated optimized speed $V_{OPT}$, the invention is described in tight relationship with the sequencing and numerical integration mechanism, replacing the maneuvering speeds conventionally used, that is to say the minimum speeds of setup of aerodynamic configuration, and which constitutes a condition for exiting the numerical integration segments. Moreover, it optionally involves iterations so as to optimize the aerodynamic configuration of the aeroplane on the segments considered. However, the same logic can be applied in an analogous manner by formulating formal constraints equivalent to these exit conditions.

The method of automatic determination 102 according to the invention is based on the algorithms for computing predictions conventionally used by current flight management systems FMS.

According to the preferred embodiment of the invention, the method of automatic determination 102 is applied by means of a backward trajectory computation, and makes it possible to establish successively various aerodynamic configurations until the smooth configuration is established according to an order predefined by the sequencer of the state machine and dependent on the deceleration strategy chosen by the pilot.

An aerodynamic configuration is defined here in a broad sense as being an aerodynamic configuration corresponding to a permitted combination of the states of deployment of the deceleration elements or actuators of the aircraft, namely the slats, the flaps, the landing gear and optionally the airbrakes.

The states of deployment of the actuators are each provided by a parameter representative of a first angle made by the slats with a first predetermined direction, of a second angle made by the flaps with a second predetermined direction, of a third angle made by the airbrakes with a third predetermined direction, and the extended state of the landing gear. Thus an aerodynamic configuration of the aircraft can be defined and identified by an associated vector of the states of deployment of the various actuators of the aircraft.

The method of automatic determination 102 comprises a set of steps.

In a first initialization and input step 104, the pilot conventionally inputs a flight plan FPLN via his flight management display FMD. In the same first step 104, the pilot inputs and selects a DECEL deceleration strategy in a menu of at least two different deceleration strategies, including a first nominal deceleration strategy, designated by NOMINAL. For example, a second deceleration strategy, designated by LATE, implements the deceleration of the aircraft later than does the first nominal deceleration strategy.

According to a variant of step 104, the second optimization strategy LATE is systematically preselected without requesting the pilot's opinion.

Thereafter, in a second backward computation initialization step 106, a counter i of current segment S(i) is set to 1 to implement the method 102 according to the invention and the integration of a first segment denoted S(1).

Generally, the descent and approach profile evolves from a start point, designated by DECEL, the start of the onset of the deceleration of the aircraft, to a backward computation start point which corresponds to a point of stabilization of the aircraft before engaging the landing phase.

Generally, the descent and approach profile comprises a sequence or string of an integer number N of segments S(i), defined between successive characteristic points SP(i), SP(i+1) and positions of change of aerodynamic configurations taken from among a set of aerodynamic configurations. The integer i designating an index or a rank of numbering and traversal by an algorithm for backward computation of the segments S(i) along the profile backwards, a segment S(i) is delimited by a backward computation start characteristic point and a backward computation arrival characteristic point, designated by SP(i) and SP(i+1) respectively.

The method of automatic determination 102 is based on a backward computation for propagating a state of the aircraft along the segments S(i) of the sequence, i varying from 1 to N from the backward computation start point SP(1), also called the stabilization point, to the start point SP(N+1) DECEL of the onset of the deceleration of the aircraft.

The backward computation start point SP(1) is the start characteristic point of the first segment S(1) and constitutes a point of stabilization of the aircraft at at least 1000 feet Above Ground Level AGL in IFR (Instrument Flight Rule) instrument flight mode or at at least 500 feet above ground level AGL in VFR (Visual Flight Mode), an operational margin possibly being added to these minima.

The current segment being initialized by the first segment S(1) with a first, so-called landing, aerodynamic configuration (3 or FULL) selectable by piloting, associated with its start characteristic point, in the same second initialization step 106, the next aerodynamic configuration of the aircraft is determined as a function of the various actuators available and of the sequence of the aerodynamic configurations which is forecast or programmed by the sequencer of the state machine, according to the information provided by the database 22 PERF DB.

Thereafter, in the same second initialization step 106, for the next aerodynamic configuration forecast for the first segment S(1), a range of speeds of possible use of the said next aerodynamic configuration is computed and provided, the range of speeds being delimited by a minimum speed $V_{min}$ and a maximum speed $V_{max}$. The range of authorized speeds takes account in particular of the authorized maximum loads on the wings of the aircraft which are provided in a database detailing the performance of the aeroplane, and of the mass of the aircraft at the start characteristic point SP(1) of the first segment S(1) provided by the aircraft state at this point SP(1).

Thereafter, in a loop 108 of traversal of the segments S(i), described by the index i of traversal of the segments, in a third step 110 of computing the next characteristic conditions, the characteristic conditions of the arrival characteristic point SP(i+1) of the current segment S(i) are determined. In this third step 110, the next characteristic conditions of the arrival characteristic point are termination conditions for the numerical integration of the current segment S(i). The next termination point or points liable to form the arrival characteristic point are in particular determined on the basis of the flight plan and of the procedure flown, and may be:
- either waypoints, with which constraints may possibly be associated; or
- points defined by a floating ground latitude/longitude along the trajectory (pseudo-waypoints, entry of constrained noise zone, etc.); or
- characteristic altitudes with limit speed for example.

Thereafter, in a fourth optimized speed computation step $V_{OPT}(i)$ 112, for the current segment S(i) an optimal speed of the aircraft is determined over the range of speeds of the next aerodynamic configuration associated with the current segment S(i) as a function of a predetermined deceleration strategy and/or of predetermined constraints inherent in the flight procedure or introduced by a pilot in his flight plan.

The deceleration strategy is a single-criterion optimization strategy which minimizes a parameter taken from among a fuel consumption, an acoustic noise level, a template of acoustic noise power, a descent time, or a multi-criterion optimization strategy which optimizes a combination of several criteria, one of them being included in the set made up of the fuel consumption, the acoustic noise level and the descent time.

The predetermined constraints inherent in the flight procedure or introduced by the pilot in his flight plan are included in the set of the constraints made up of:
  speed constraints reached at a characteristic point of a segment that are greater than or equal to a predetermined threshold value (AT OR ABOVE), or equal to a predetermined threshold value (AT), or less than or equal to a predetermined threshold value (AT OR BELOW), or included in a predetermined window of speeds (WINDOW); and
  constraints of arrival time at a characteristic point of a segment that are greater than or equal to a predetermined threshold value (AT OR AFTER), or equal to a predetermined threshold value (AT), or less than or equal to a predetermined threshold value (AT OR BEFORE), or included in a predetermined time window (WINDOW); and
  maximum-noise constraints complied with on the basis of a characteristic point of a segment or under a given altitude; and
  altitude constraints reached at a characteristic end point of a segment that are greater than or equal to a predetermined threshold value (AT OR ABOVE), or equal to a predetermined threshold value (AT), or less than or equal to a predetermined threshold value (AT OR BELOW), or included in a predetermined window of altitude (WINDOW); and fuel consumption constraints.

Thereafter, in a fifth step 114 of numerical integration of current segment, the numerical integration of the current segment S(i) is carried out to allow the propagation of the state of the aeroplane along the current segment S(i) from the associated current start characteristic point SP(i) of the backward computation to the associated current arrival characteristic point SP(i+1) of the backward computation as a function of the type of the current segment, defined by the sequencer, and of a termination condition, defined by:

either reaching the optimal speed $V_{OPT}(i)$ of the aircraft in the current segment S(i);

or reaching the associated current arrival characteristic point SP(i+1) of the backward computation without having reached the optimal speed of the aircraft.

The numerical integration of the current segment consists in determining the portion of the trajectory of temporal evolution of the state of the aeroplane while taking into account the type of the segment and its associated constraints.

In a seventh branching step 116, an eighth step 118 of verifying non-exceeding of a limit-slope threshold authorized for the current segment S(i) is executed when the optimal speed $V_{OPT}(i)$ of the aircraft is reached in the current segment S(i), or a ninth step 120 of evaluating benefit in advancing a change of aerodynamic configuration is implemented when the associated current arrival characteristic point SP(i+1) of the backward computation is reached without having reached the optimal speed $V_{OPT}(i)$ of the aircraft.

In the eighth step 118, a limit slope $FPA_{lim}(i)$ associated with the deployment of the next aerodynamic configuration is determined as being the maximum slope followed by the aircraft allowing the speed of the aircraft to be maintained under "idle" thrust without airbrake and without acceleration, and the associated slope of the current segment S(i) is thereafter compared with the previously determined limit slope $FPA_{lim}(i)$. The objective of this maintaining function is to avoid overly steep descents, commonly called "TOO STEEP PATH".

In the ninth step 120, the performance, in terms of optimization according to the chosen DECEL strategy, of a first solution consisting in advancing the change of aerodynamic configuration at the arrival point of the current segment, and of a second solution consisting in not advancing the current change of aerodynamic configuration are compared Thereafter, in a tenth branching step 122, the eighth step 118 is executed when the performance of the first solution in terms of optimization according to the chosen DECEL strategy is better than that of the second solution, or otherwise an eleventh step 124 is executed.

In the eleventh step 124, it is sought whether an alternative aerodynamic configuration to the nominal aerodynamic configuration exists, while being equivalent in terms of rank in the nominal sequence for stringing together the nominal aerodynamic configurations.

In a twelfth branching step 126, at least the ninth and tenth steps 120, 122 are executed when there exists an alternative aerodynamic configuration equivalent to the nominal aerodynamic configuration forecast by the sequencer, or a thirteenth step 128 of maintaining the current or present aerodynamic configuration is executed when there does not exist or no longer exists any alternative aerodynamic configuration equivalent to the nominal aerodynamic configuration forecast by the sequencer.

The implementation of the thirteenth step 128 is a consequence of the refusal by step 118 or step 120 to undertake the activation of the next aerodynamic configuration forecast at the arrival characteristic point SP(i+1) of the current segment S(i). The activation of the actuator or actuators of current aerodynamic configuration being maintained for the current segment S(i), the next nominal aerodynamic configuration to be forecast for the next segment S(i+1) will be identical to the next nominal aerodynamic configuration determined for the current segment S(i).

In a fourteenth branching step 130, subsequent to the eighth step 118, the eleventh step 124 is executed when the slope associated with the current segment S(i) is greater than or equal to the limit slope $FPA_{lim}(i)$, or a fifteenth step 132 of modifying the aerodynamic configuration of the arrival characteristic point SP(i+1) of the current segment is executed when the slope associated with the current segment S(i) is strictly less than the limit slope $FPA_{lim}(i)$.

In the fifteenth step 132, the aerodynamic configuration of the aircraft is modified by activating the new configuration at the arrival characteristic point of the current segment S(i).

Thereafter, in a sixteenth step 134, the next configuration or configurations (at least the next nominal configuration and alternative configurations if appropriate) are determined as a function of the various actuators available and of the sequence of the aerodynamic configurations forecast or programmed by the sequencer of the state machine according to the information provided by the database 22 PERF DB.

In a seventeenth step 136, for the next aerodynamic configuration forecast for the next segment S(i+1), a range of speeds of possible use of the said next aerodynamic configuration is computed and provided, the speed range being delimited by a minimum speed $V_{min}(i+1)$ and a maximum speed $V_{max}(i+1)$. The range of authorized speeds takes account in particular of the authorized maximum loads on the wings of the aircraft provided in a database detailing the performance of the aeroplane, and of the mass of the aircraft at the arrival characteristic point SP(i+1) of the current segment S(i) provided by the aircraft state at this point computed in the step of integrating the current segment S(i).

In an eighteenth step 138, subsequent to step 128 or step 136, as long as the deceleration phase has not terminated or in a more restricted manner as long as the aircraft is not in a smooth configuration with landing gear retracted, the current index i of traversal of the segments is incremented by one unit. The aerodynamic configuration maintained in step 128 or the new configuration activated in step 132 become the active aerodynamic configuration of the start characteristic point SP(i) of the current segment S(i) after incrementation of the current index i. Furthermore, the next aerodynamic configuration or configurations determined in step 134 in the case of a modification of the previous segment, or the next configuration or configurations determined prior to step 128 in the case of maintaining of the current configuration, constitute the next aerodynamic configuration or configurations to be activated if this is possible for the present or current segment S(i) obtained on exit from the eighteenth step 138.

The algorithm of the loop 108 stops when the deceleration phase has terminated or in a more restricted manner when the aircraft is in a smooth configuration with landing gear retracted.

A descent and approach profile is obtained by assembling the segments in a direction reverse to that of the backward computation.

The method of automatic determination 102 such as described hereinabove makes it possible to predict and to exhibit to the crew points of setup of configuration or activation of various aerodynamic configurations, which points are optimized in regard to various criteria considered alone or in combination, viz.:
one or more speed constraints,
one or more time constraints,
optimization of the fuel consumption,
minimization of the acoustic noise,
loads on the wings.

It should be noted that the flyability of the profile will always be combined with one or more of the aforementioned criteria.

The method of automatic determination 102 such as described hereinabove exhibits advantages of:
generating savings of fuel and of time with respect to a nominal deceleration strategy;
widening the min/max ETA (Estimated Time of Arrival) ranges for the functions of RTA type (adjustment of the arrival time)
improving the precision of the predictions of the FMS and therefore strengthening the confidence of crews in the system:
through modelling which is closer to operational practices (elements of advancement to stabilize the aircraft energy-wise according to the chosen strategy),
by limiting the deceleration phase and therefore the flight time exposed to the application of possible non-optimal deceleration margins.

Figures 3A, 3B:
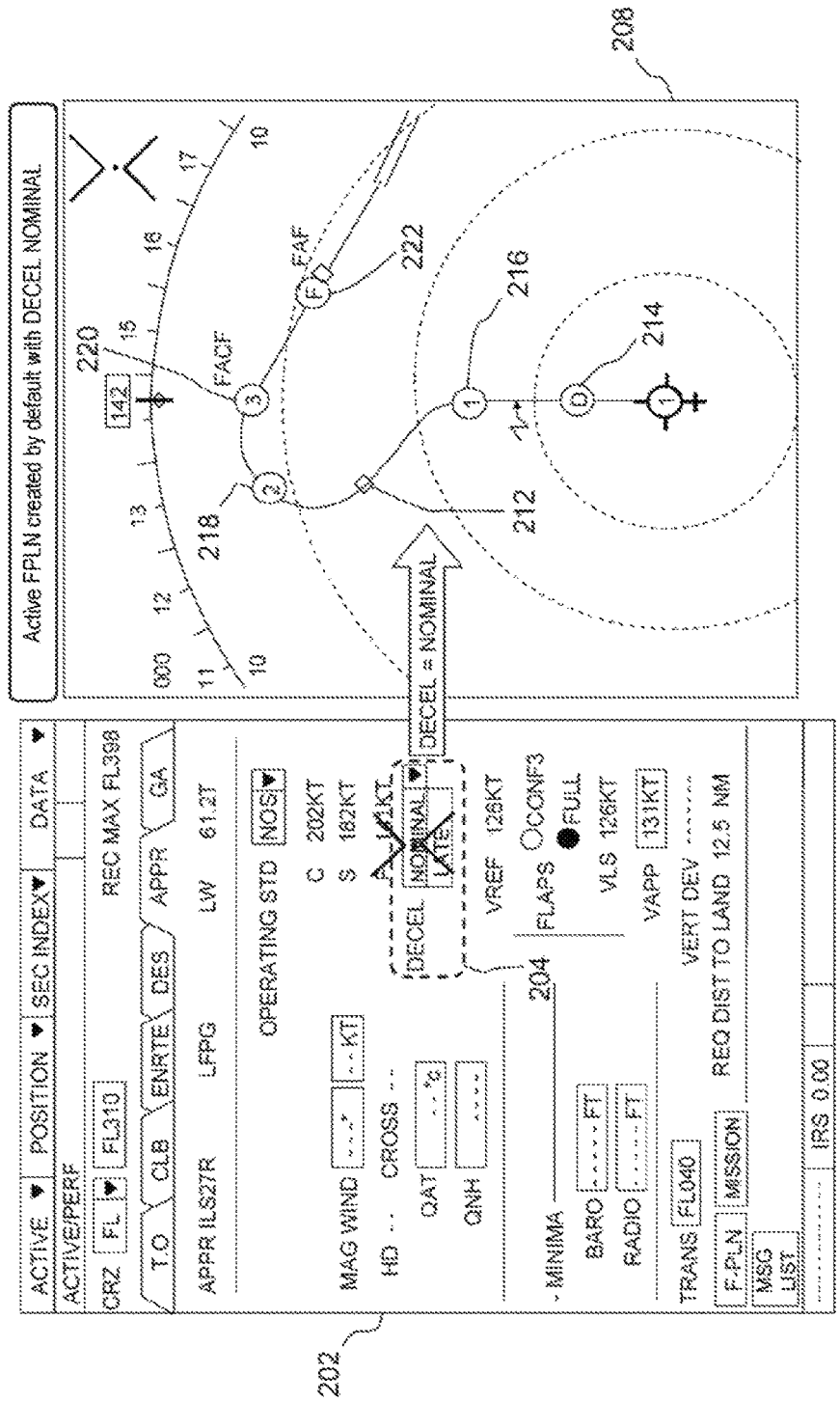
FIGS. 3A and 3B are respective views of a display of the inputting of the selection of a deceleration strategy, here nominal, and of a navigation display including aerodynamic configuration change points corresponding to the nominal deceleration strategy selected.

According to FIG. 3A and an example of a means for displaying and inputting flight commands of the cockpit, a display with flight commands screen 202, termed FMD (Flight Management Display), comprises a graphical object of menu box type 204 making it possible to display a DECEL menu of commands for selecting a deceleration strategy or a type of deceleration from a set comprising at least two different deceleration strategies, among which are a conventional nominal strategy, termed NOMINAL, and a strategy of deceleration delayed with respect to that of the nominal strategy, termed LATE. Here, the nominal strategy NOMINAL has been selected.

According to FIG. 3B and an exemplary navigation or lateral trajectory display 208, termed ND (Navigation Display), the lateral trajectory 212 associated with the selected nominal deceleration strategy includes pseudo-waypoints 214, 216, 218, 220, 222, here only of change of speed and phase or aerodynamic configurations, designated respectively by D, 1, 2, 3, 4 or F, and corresponding respectively to the start point of the onset of the deceleration, marking the start of the approach phase, or backward computation arrival characteristic point with smooth configuration and change of speed, to a first characteristic point of extension of the slats according to a first slats angle made by the slats and a predetermined reference direction of the slats, to a second characteristic point of extension of the slats and flaps according to a second slats angle and a second flaps angle made by the flaps and a predetermined reference direction of the flaps, to a third characteristic point of extension of the slats and flaps according to a third slats angle and a third flaps angle, and a fourth characteristic point of extension of the slats and of the flaps according to a fourth slats angle and a fourth flaps angle, the fourth characteristic point also forming the backward computation start characteristic point.

The present invention is not limited to a particular number of configurations of the slats and flaps and can sit within discrete extension logic with an arbitrary predetermined number JN of configurations.

Generally, the aerodynamic configurations of a given aircraft type are identified by a different integer index j for numbering the aerodynamic configuration, j varying from 1 to JN, and JN designating the total number of aerodynamic configurations allowed by the sequencer. Each aerodynamic configuration j is characterized by a combination of deployment states of actuators from among the slats, the flaps, the airbrakes, the landing gear.

The states of deployment of the actuators are for example:
a first angle $\theta_{slats}$ representative of a degree of deployment of the slats;
a second angle $\theta_{flaps}$ representative of a degree of deployment of the flaps;
a third angle $\theta_{airbrakes}$ representative of a degree of deployment of the airbrakes; and
the extended state of the landing gear.

A choice will be available for the crew in the cockpit, in such a way that they can choose a mode of computation of the deceleration in such a way that it is nominal, adjusted and optimized, or late, according to the conditions of the flight and the criteria defining the flight strategy.

According to FIG. 4A, the deceleration strategy LATE is selected from the menu box 204 for choosing the deceleration strategy.

Subsequent to the activation of the delayed deceleration strategy LATE, a secondary flight plan is created. The instants of setup of configuration are consequently adjusted according to the method of automatic determination 202 of FIG. 2, and this adjustment is visible on a secondary lateral trajectory 232, represented in FIG. 4B.

According to FIG. 4B and the secondary trajectory 232, the characteristic points 214, 216, 218, 220, 222 of the nominal trajectory 212, associated respectively with the deceleration point and aerodynamic configuration change points D, 1, 2, 3, 4 are replaced with characteristic points 234, 236, 238, 240 associated respectively with the aerodynamic configurations D, 1, 3, 4.

It is apparent on the secondary trajectory 232 that the deceleration point D is delayed and the aerodynamic configuration 1 has been deleted, the aerodynamic configuration 2 being activated subsequent to the smooth aerodynamic configuration.

According to FIGS. 5A and 5B, the pilot maintains his choice to implement the delayed deceleration strategy LATE, and inserts the corresponding temporary flight plan, determined by the method of automatic determination 102 and displayed in FIG. 4B by the temporary lateral trajectory coloured in a first colour and/or represented by a first pattern (here shown dashed), by inserting the said temporary plan, this being manifested by the display of the lateral trajectory 232 in a second colour and/or a second pattern (here shown solid).

Figure 6:
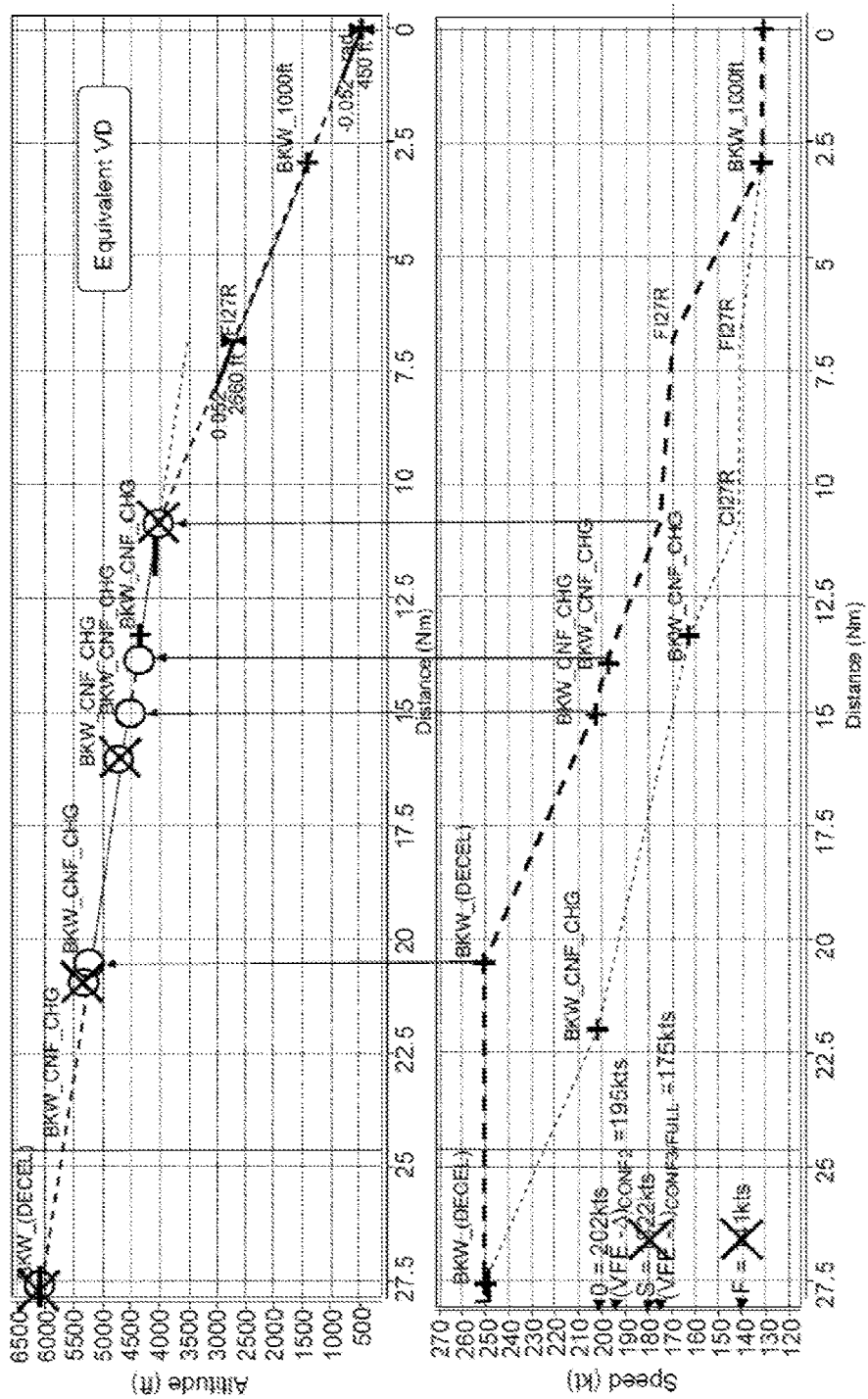
FIG. 6 is a view of a comparative vertical display as altitudes and speeds of the profiles associated respectively with a nominal deceleration strategy and a delayed deceleration strategy.

According to FIG. 6, the altitude profiles 252, 254 and speed profiles 262, 264, associated respectively with the NOMINAL and LATE deceleration strategies, are superimposed according to a Vertical Display VD.

The profiles 252, 254, 262, 264 illustrate the disparities of speeds and the disparities between the pseudo-waypoints of setup of aerodynamic configuration existing between the NOMINAL and LATE deceleration strategies.

Generally, a pseudo-waypoint is defined as a floating point, that is to say a point whose geographical position is variable over a lateral trajectory which is fixed as a function of predetermined constraints.

Figure 7:
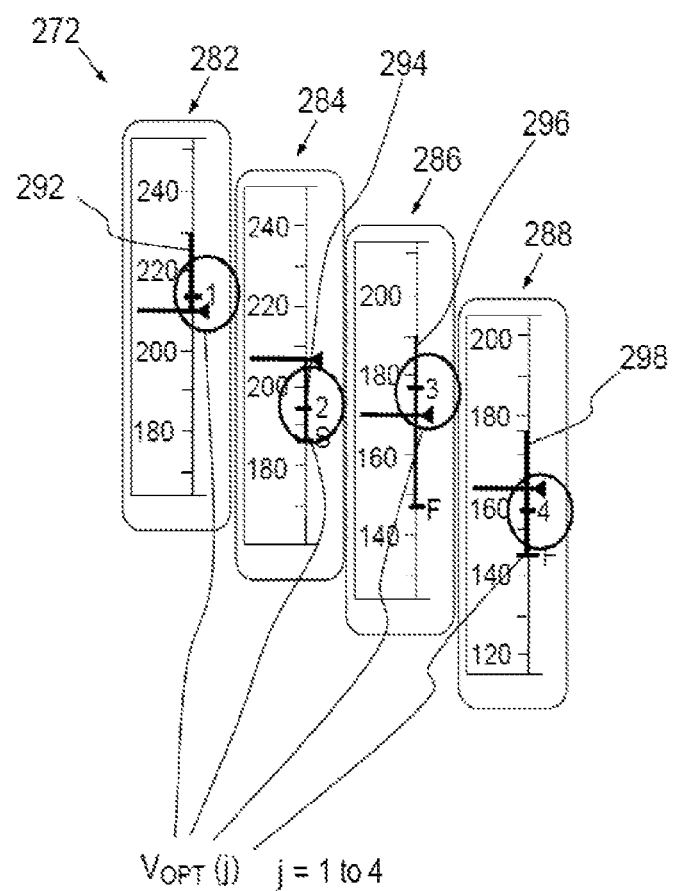
FIG. 7 is a view of a display of the information about speeds allowing the changes of aerodynamic configurations determined by the method of automatic determination of FIG. 2.

According to FIG. 7 and an exemplary display, a Primary Flight Display 272, PFD, is configured to display optimized speeds $V_{OPT}$, computed according to the method of automatic determination 102 for each of the configurations allowing the implementation of a selected deceleration strategy DECEL.

The primary flight display 272 is configured to display a speed banner each corresponding to an aerodynamic configuration j.

Here, in FIG. 7, four aerodynamic configurations 282, 284, 286, 288 are represented by their respective speed banners 292, 294, 296, 298.

The first configuration 282, corresponding to the identification index j equal to 1 for example, is characterized by the first speed banner 292, delimited by the value of the minimum deployment speed $V_{min}(1)$ equal to 210 kts and the value of the deployment speed $V_{max}(1)$ equal to 230 kts. A first mark 302 points at the minimum value $V_{min}(1)$ and emphasizes it by a first geometric shape and/or a distinctive inherent colour and a second mark 304 points at the maximum value $V_{max}(1)$ and emphasizes it by a second geometric shape and/or a second distinctive inherent colour. The value of the optimized speed $V_{OPT}(1)$, computed by the method of automatic determination 102 and lying between the minimum deployment speed $V_{min}(1)$ and the maximum deployment value $V_{max}(1)$, here equal to 213 kts, is pointed at by a third mark 306 disposed alongside the index j of the aerodynamic configuration, here set to 1.

The second configuration 284, corresponding to the identification index j equal to 2, is characterized by the second speed banner 294 delimited by the value of the minimum deployment speed $V_{min}(2)$ equal to 185 kts and the value of the deployment speed $V_{max}(2)$ equal to 200 kts. A first mark 302 points at the minimum value $V_{min}(2)$ and emphasizes it by a first geometric shape and/or a distinctive inherent colour and a second mark 304 points at the maximum value $V_{max}(2)$ and emphasizes it by a second geometric shape and/or a second distinctive inherent colour. The value of the optimized speed $V_{OPT}(2)$ computed by the method of automatic determination 102 and lying between the minimum deployment speed $V_{min}(2)$ and the maximum deployment value $V_{max}(2)$, here equal to 195 kts, is pointed at by a third mark 306 disposed alongside the index j of the aerodynamic configuration, here set to 2.

The third configuration 286, corresponding to the identification index j equal to 3, is characterized by the third speed banner 296 delimited by the value of the minimum deployment speed $V_{min}(3)$ equal to 148 kts and the value of the deployment speed $V_{max}(3)$ equal to 186 kts. A first mark 302 points at the minimum value $V_{min}(3)$ and emphasizes it by a first geometric shape and/or a distinctive inherent colour and a second mark 304 points at the maximum value $V_{max}(3)$ and emphasizes it by a second geometric shape and/or a second distinctive inherent colour. The value of the optimized speed $V_{OPT}(3)$ computed by the method of automatic determination 102 and lying between the minimum deployment speed $V_{min}(3)$ and the maximum deployment value $V_{max}(3)$, here equal to 176 kts, is pointed at by a third mark 306 disposed alongside the index j of the aerodynamic configuration, here set to 3.

The fourth configuration 288, corresponding to the identification index j equal to 4, is characterized by the fourth speed banner 298, delimited by the value of the minimum deployment speed $V_{min}(4)$ equal to 148 kts and the value of the deployment speed $V_{max}(4)$ equal to 176 kts. A first mark 302 points at the minimum value $V_{min}(4)$ and emphasizes it by a first geometric shape and/or a distinctive inherent colour and a second mark 304 points at the maximum value $V_{max}(4)$ and emphasizes it by a second geometric shape and/or a second distinctive inherent colour. The value of the optimized speed $V_{OPT}(4)$ computed by the method of automatic determination 102 and lying between the minimum deployment speed $V_{min}(4)$ and the maximum deployment value $V_{max}(4)$, here equal to 158 kts, is pointed at by a third mark 306 disposed alongside the index j of the aerodynamic configuration, here set to 4.

The displaying of the speed banners is complementary to the displaying on the navigation display ND of the pseudo-waypoints where the aerodynamic configuration changes and/or to the displaying on the vertical display VD of the same pseudo-waypoints where the aerodynamic configuration changes.

The displaying of the speed banners is also complementary to the optional textual messages displayed on the principal flight display PFD or on any equivalent means, for example the messages displayed by an Airbus aeroplane of type A350 and termed "EXTEND CONFx".

Generally, the optimized speed $V_{OPT}(j)$ is the speed at which one envisages a change of aerodynamic configuration into the aerodynamic configuration of index j at the pseudo-waypoint of change of configuration if such a point exists.

It should be noted that no function, currently present in a system of FMS or equivalent type, is aimed at optimizing the instants of setup of configurations by considering multiple criteria such as the upholding of constraints on speed/time/noise/slope, complying with the loads on the wings.

Generally, no multi-criterion adaptive scheme exists today which makes it possible to adapt the speeds of setup of configuration for each flight, according to the particularities of the procedures, predicted or actual meteorological conditions, constraints on speeds, time, noise and other parameters.

The speeds conventionally used today are the maneuvering speeds or the maximum limit speeds, hence the minimum or maximum speeds of setup of configuration.

It should also be noted that various elements and arguments work in favour of energy management, and more specifically of the deceleration on approach phase, through the adjustment of the instants of setup of configuration.

Firstly, configuring the aeroplane generally makes it possible to increase the deceleration capacity, and to widen the flight domain in terms of speed, thus making it possible to reach lower speeds, progressively down to the final approach speed. It is therefore used by pilots as a means for managing the energy on approach in order to stabilize, the objective being to reach approach speed on the Glide, at the latest at 500 ft or 1000 ft AGL. Given that it is favourable to decelerate as late as possible in order to reduce fuel consumption, this constitutes a first argument for recomputing the speeds of extension of the slats and flaps.

Thereafter, adjusting the instants of setup of configuration also constitutes a lever making it possible to comply with speed constraints of all types (AT, AT OR ABOVE, AT OR BELOW), as imposed by the DO-236C standard entitled "Minimum Aviation System Performance Standards: Required Navigation Performance for Area Navigation Performance for Area Navigation".

Furthermore, these speeds, having an impact on the deceleration profile flown, have a direct impact on the flight time, and therefore make it possible to comply with a time constraint fixed by the air traffic control for example, and therefore to widen the ETA$_{min}$/ETA$_{max}$ range, thus favouring the capacity of the aircraft to satisfy an RTA (Required Time of Arrival) on approach.

Finally, the setting up of aerodynamic configurations has an impact on the speed profile and the aerodynamic configuration of the aeroplane, and therefore on the noise emitted by the aeroplane, and perceived on the ground by the populations or a microphone. This fourth argument strengthens the necessity to adjust the speeds of setup of configuration to find the best fuel/time/noise compromise.

The proposed solution is therefore advantageous since it relies in part on existing computation modules, and makes it possible to render the system closer to operational reality.

Moreover, it offers the possibility of reducing the operational costs for companies through a systematized fuel consumption reduction, since the optimal strategy can be displayed to the crew, thereby guaranteeing its application.

Furthermore, the solution also introduces a lever on the separation of aircraft through possible adjustment of the flight time on approach, and possible compliance with the speed constraints of type AT and AT OR ABOVE.

Finally, the solution exhibits the advantage of taking into account the sound nuisance related to the aircraft, so as to obtain the best compromise between the comfort of local residents of airport zones and the expenses incurred by the company.

It is applicable in any predictions computation present in an FMS. The invention is also applicable in any navigation means, onboard or not, managing the trajectory of an aircraft (drone for example).

The method of automatic determination according to the invention makes it possible to inform the pilot(s) in a reliable manner about their deceleration strategy as well as about the actions to be undertaken so as to decelerate according to the previously chosen strategy.

Moreover, still with a view to reducing the environmental footprint of each flight, the invention makes it possible to limit the impact of the systematic use of margins that degrade the optimality of the profile.

Generally, the invention also relates to an aircraft using the method of automatic determination of an approach profile such as described hereinabove and optimizing the management of the aerodynamic configuration of the said aircraft.

Generally, the method of automatic determination 102 is based on the computation of the FMS predictions and consists in computing an optimal late deceleration of an aircraft on approach. This computation includes a computation of the minimum and maximum achievable speeds of setup of configuration, a computation of the characteristic points of the trajectory and a computation of the optimized speeds of setup of configuration while taking account of the various constraints (fuel, time, noise, loads, etc).

As a variant of the method of determination of FIG. 2, a method of automatic determination of an approach profile for an aircraft according to the invention optimizing the management of the aerodynamic configuration of the aircraft uses the described logic of the method of FIG. 2 in a trajectory computation, defined in the French patent application registered under the filing number FR 14/02752, by formulating it in the form of constraints. The trajectory computation method, described in this French patent application, makes it possible to compute an optimized trajectory by directly integrating the coupling of the horizontal and vertical flight phases in the computation of the flight plan. This trajectory computation method is based on an optimal control approach, through for example modelling as a Bolza problem. The trajectory is then determined by known optimal control solution tools, with tradeoff according to the method between the constraints so as to determine their optimal sequence. Such a method allows global determination of the trajectory which does not rely on integration by segments.

The invention claimed is:

1. A method of automatic determination of a descent and approach profile for an aircraft, implemented on a basis of a flight management system based on one or more electronic computers, the descent and approach profile implemented by the flight management system evolving from a start point DECEL of onset of deceleration of the aircraft to a stabilization point, comprising a sequence of segments defined between successive characteristic points some of which are aerodynamic configuration change points, configurations being taken from among a discrete set of predetermined aerodynamic configurations;

the method of automatic determination implemented by the flight management system being based on a backward computation for propagating a state of the aircraft along the segments of the sequence from the stabilization point to the start point DECEL of the onset of the deceleration of the aircraft; and the method of automatic determination implemented by the flight management system comprising for each current segment S(i) covered in a profile, delimited between an associated current start characteristic point SP(i) of the backward computation and an associated current arrival characteristic point SP(i+1) of the backward computation, wherein i is an integer designating an index or a rank of numbering for traversal of the backward computation, a step of determination of one or more next aerodynamic configurations C(j+1) of the aircraft implemented by the flight management system on a basis of a current configuration C(j) active at a current start characteristic point SP(i) of the backward computation and of a nominal sequence of change of aerodynamic configurations, wherein j is an integer designating an aerodynamic configuration; and a step of determination and provision for the next aerodynamic configuration or configurations C(j+1) of a range of speeds of possible use of the said next aerodynamic configuration C(j+1) implemented by the flight management system, delimited by a minimum speed V$_{min}$(j+1) and a maximum speed V$_{max}$(j+1);

the method of automatic determination implemented by the flight management system comprising for each current segment covered S(i), a step of determination of an optimal speed V$_{OPT}$(i) of the aircraft over the range of speeds of the next aerodynamic configuration C(j+1), said optimal speed V$_{OPT}$(i) of the aircraft being dependent on at least one of the following: a predetermined deceleration strategy and on predetermined constraints inherent in a flight procedure or introduced by a pilot in his flight plan; and displaying on one or more displays the descent and approach profile for the aircraft.

2. The method of automatic determination of a descent and approach profile according to claim 1, wherein the deceleration strategy is a single-criterion optimization strategy which minimizes a parameter taken from among a fuel consumption by the aircraft, a level of acoustic noise generated by the aircraft, a travel time, or a multi-criterion optimization strategy which optimizes a combination of several criteria, at least one of them being included in the set made up of a fuel consumption, an acoustic noise level and a travel time.

3. The method of automatic determination of a descent and approach profile according to claim 1, wherein the predetermined constraints inherent in the flight procedure or introduced by the pilot in his flight plan are included in the set of the constraints made up of:
    constraints of speed reached at a characteristic point of a segment that are greater than or equal to a predetermined threshold value (AT OR ABOVE), or equal to a predetermined threshold value (AT), or less than or equal to a predetermined threshold value (AT OR BELOW), or included in a window of predetermined speeds (WINDOW); and
    constraints of arrival time at a characteristic point of a segment that are greater than or equal to a predetermined threshold value (AT OR AFTER), or equal to a predetermined threshold value (AT), or less than or equal to a predetermined threshold value (AT OR BEFORE), or included in a predetermined time window (WINDOW); and
    noise constraints complied with on the basis of a characteristic point of a segment; and
    constraints of altitude reached at a characteristic end point of a segment that are greater than or equal to a predetermined threshold value (AT OR ABOVE), or equal to a predetermined threshold value (AT), or less than or equal to a predetermined threshold value (AT OR BELOW), or included in a predetermined window of altitude (WINDOW); and
    fuel consumption constraints.

4. The method of automatic determination of a descent and approach profile according to claim 1, further comprising for each current segment S(i) covered a step of numerical integration of the said segment S(i), making it possible to propagate the state of the aircraft along the current segment S(i) from the associated current start characteristic point SP(i) of the backward computation to an associated current arrival characteristic point SP(i+1) of the backward computation, and carried out as a function of the type of the current segment S(i), defined by a sequencer, and of a termination condition, defined by:
    either reaching the optimal speed of the aircraft in the current segment;
    or reaching the associated current backward computation arrival characteristic point without having reached the optimal speed of the aircraft.

5. The method of automatic determination of a descent and approach profile according to claim 4, wherein;
    the type of segment is included in the set made up of:
        a segment of FPA (Flight Path Angle) type consisting in fixing a slope with respect to the ground; and
        a segment of OPEN type consisting in fixing an engine rating; and
        a segment of VS type consisting in fixing a vertical speed; and
        a segment of LEVEL type consisting in fixing an altitude;
        a segments of FPA, OPEN, VS, LEVEL type being able to be implemented by choice in decelerated mode, in constant-speed mode or in accelerated mode.

6. The method of automatic determination of a descent and approach profile according to claim 4, comprising a flyability test step, executed when the optimal speed of the aircraft is reached, consisting in:
    determining a limit slope $FPA_{lim}$ associated with a deployment of a new configuration C(j+1) as a maximum slope in absolute value allowing the speed of the aircraft to be maintained under "idle" thrust without airbrake and without acceleration, and
    comparing the slope of the current segment S(i) with the limit slope $FPA_{lim}$ determined.

7. The method of automatic determination of a descent and approach profile according to claim 6, wherein;
    when the slope of the current segment S(i) is greater than or equal to the limit slope $FPA_{lim}$ on a new nominal configuration forecast,
    it is sought whether an alternative aerodynamic configuration to a new nominal aerodynamic configuration exists, and
    if it is determined that a new alternative aerodynamic configuration exists, for this alternative a performance is compared in terms of optimization according to a DECEL strategy chosen between a first solution consisting in advancing the change of aerodynamic configuration at an arrival point of the current segment with this alternative, and a second solution consisting in not advancing the current change of aerodynamic configuration; and
    in the case where for this alternative the performance in terms of optimization according to a chosen DECEL strategy of a first solution is better than that of a second solution, then a limit slope $FPA_{lim}$ associated with the deployment of the new alternative aerodynamic configuration is determined as a maximum slope in absolute value allowing the speed of the aircraft to be maintained under "idle" thrust without airbrake and without acceleration,
    and then the slope of the current segment S(i) is compared with the limit slope $FPA_{lim}$ determined; then
    in the case where the slope of the current segment S(i) is strictly less than or equal in absolute value to the limit slope $FPA_{lim}$ determined, in a step of modifying the current aerodynamic configuration, the change of current aerodynamic configuration into the new alternative aerodynamic configuration is carried out; and
    in the case where there does not exist any new alternative aerodynamic configuration for which the slope of the current segment S(i) is strictly less than or equal in absolute value to the limit slope $FPA_{lim}$ determined the current aerodynamic configuration is maintained for an integration of the next segment S(i+1).

8. The method of automatic determination of a descent and approach profile according to claim 6, wherein;
    when the slope of the current segment S(i) is strictly less than or equal to the limit slope $FPA_{lim}$ for a new aerodynamic configuration C(j+1), in a step of modifying a current aerodynamic configuration, the change of current aerodynamic configuration into a new nominal aerodynamic configuration according to a nominal sequence of a sequencer is carried out.

9. The method of automatic determination of a descent and approach profile according to claim 4, wherein;
    when the characteristic point forming an associated current arrival point of the backward computation is reached without having reached the optimal speed of the aircraft, a performance is compared in terms of optimization according to a DECEL strategy chosen between a first solution consisting in advancing the change of aerodynamic configuration at the arrival point of the current segment S(i), and a second solution consisting in not advancing the current change of aerodynamic configuration; and in the case where the performance in terms of optimization according to a chosen DECEL strategy of the first solution is better than that of the second solution, a limit slope $FPA_{lim}$ associated with a deployment of the new aerodynamic configuration is determined as a maximum slope allowing the speed of the aircraft to be maintained under "idle" thrust without airbrake and without acceleration, then the slope of the current segment S(i) is compared with a limit slope $FPA_{lim}$.

10. The method of automatic determination of a descent and approach profile according to claim 4, wherein;

when an associated current backward computation arrival characteristic point is reached without having reached the optimal speed of the aircraft, a performance is compared in terms of optimization according to a DECEL strategy chosen between a first solution consisting in advancing the change of aerodynamic configuration at the arrival characteristic point of the current segment, and a second solution consisting in not advancing the current change of aerodynamic configuration; and in the case where the performance in terms of optimization according to a chosen DECEL strategy of the second solution is better than that of the first solution, it is sought whether an alternative aerodynamic configuration to a nominal aerodynamic configuration exists, and if it is determined that an alternative aerodynamic configuration exists, for this alternative the performance is compared in terms of optimization according to the DECEL strategy chosen between a first solution consisting in advancing the change of aerodynamic configuration at the arrival point of the current segment with this alternative, and a second solution consisting in not advancing a current change of aerodynamic configuration.

11. A method of automatic determination of a descent and approach profile for an aircraft, implemented on the basis of a flight management system based on one or more electronic computers, the descent and approach profile implemented by the flight management system evolving from a start point DECEL of onset of the deceleration of the aircraft to a stabilization point, comprising a sequence of horizontal and vertical flight phases passing through successive characteristic points some of which are aerodynamic configuration change points, the configurations being taken from among a discrete set of predetermined aerodynamic configurations C(j), wherein j is an integer designating an aerodynamic configuration;

the method of automatic determination implemented by the flight management system being based on a computation of optimized trajectory which directly integrates the coupling of horizontal and vertical flight phases into a flight plan and comprising:

a step of providing aerodynamic configurations C(j) and of computing for each aerodynamic configuration a range of speeds of possible use of the said aerodynamic configuration implemented by the flight management system, delimited by a minimum speed $V_{min}(j)$ and a maximum speed $V_{max}(j)$;

a step of formulating a problem of computing a global trajectory from the start point DECEL to the stabilization point in the form of an optimal-control problem implemented by the flight management system;

a step of solving implemented by the flight management system the optimal-control problem with a tradeoff between constraints of use of the aerodynamic configurations so as to determine their optimal sequence, a computation of the characteristic points and a computation of speeds of setup of configuration $V_{OPT}(j)$ optimized as a function of at least one of the following: a predetermined deceleration strategy and of predetermined constraints inherent in a flight procedure or introduced by a pilot in his flight plan; and displaying on one or more displays the descent and approach profile for the aircraft.

12. A system for automatic determination of a descent and approach profile for an aircraft comprising:

a flight management system based on one or more electronic computers, a data input device configured to allow a pilot to enter data into the flight management system;

one or more displays for displaying one or more descent profiles of the aircraft, and; wherein the descent and approach profile of the aircraft is forecast to evolve from a start point DECEL of onset of a deceleration of the aircraft to a backward computation start point, and comprises a string of segments defined between successive characteristic points and positions of change of aerodynamic configurations taken from among an integer number of predetermined aerodynamic configurations; and the flight management system is configured to:

implement a method of automatic determination, based on a backward computation for propagating a state of the aircraft along the segments of the string from the backward computation start point to the start point DECEL of the onset of the deceleration of the aircraft; and implement for each current segment S(i) covered in a profile, delimited between an associated current start characteristic point SP(i) of the backward computation and an associated current arrival characteristic point SP(i+1) of the backward computation, wherein i is an integer designating an index or a rank of numbering for traversal of the backward computation, a step of determining one or more next aerodynamic configurations C(j+1) of the aircraft on the basis of a current configuration C(j) active at the current start characteristic point SP(i) of the backward computation and of a nominal sequence of change of aerodynamic configurations, wherein j is an integer designating an aerodynamic configuration; and a step of determining and providing for the next aerodynamic configuration or configurations C(j+1) a range of possible speeds of use of an aerodynamic configuration C(j+1), delimited by a minimum speed $V_{min}(j+1)$ and a maximum speed $V_{max}(j+1)$;

the system for automatic determination of a descent and approach profile wherein:

the data input device and the flight management system are configured to leave the choice to the pilot to enter and select a deceleration strategy; and the flight management system is configured to determine for each current segment covered S(i) an optimal speed $V_{OPT}(j+1)$ of the aircraft over the range of speeds of the next aerodynamic configuration C(j+1) as a function of at least one of the following: the deceleration strategy chosen and of predetermined constraints inherent in a flight procedure or introduced by a pilot in his flight plan.

13. The system for automatic determination of a descent and approach profile for an aircraft according to claim 12, wherein the flight management system is configured to:
provide the pilot via one or more displays with an optimal aerodynamic configuration change speeds and/or pseudo-waypoints on a predicted trajectory at which to perform changes of aerodynamic configuration and/or
provide an automatic pilot with the optimal aerodynamic configuration change speeds and/or instants of change of aerodynamic configuration for actuating a corresponding actuator or actuators.

14. The system for automatic determination of a descent and approach profile for an aircraft according to claim 12, further comprising:
a set of actuators, made up of slats, flaps, airbrakes, a landing gear of the aircraft, for implementing various aerodynamic configurations allowed by a sequencer,
each aerodynamic configuration comprising a combination of states of deployment of the actuators from among the slats, the flaps, the airbrakes, the landing gear,
the states of deployment of the actuators each being provided by a parameter representative:
of a first angle made by the slats with a first predetermined direction;
of a second angle made by the flaps with a second predetermined direction;
of a third angle made by the airbrakes with a third predetermined direction; and
of an extended state of the landing gear.

15. A display of changes of aerodynamic configurations, wherein an automatic determination of a descent and approach profile for an aircraft, implemented on a basis of a flight management system based on one or more electronic computers,
the descent and approach profile implemented by the flight management system evolving from a start point DECEL of onset of deceleration of the aircraft to a stabilization point, comprising a sequence of segments defined between successive characteristic points some of which are aerodynamic configuration change points, configurations being taken from among a discrete set of predetermined aerodynamic configurations;
the automatic determination implemented by the flight management system being based on a backward computation for propagating a state of the aircraft along the segments of the sequence from the stabilization point to the start point DECEL of the onset of the deceleration of the aircraft; and
the automatic determination implemented by the flight management system comprising for each current segment S(i) covered in a profile, delimited between an associated current start characteristic point SP(i) of the backward computation and an associated current arrival characteristic point SP(i+1) of the backward computation, wherein i is an integer designating an index or a rank of numbering for traversal of the backward computation,
a determination of one or more next aerodynamic configurations C(j+1) of the aircraft implemented by the flight management system on a basis of a current configuration C(j) active at a current start characteristic point SP(i) of the backward computation and of a nominal sequence of change of aerodynamic configurations, wherein j is an integer designating an aerodynamic configuration; and
a determination and provision for the next aerodynamic configuration or configurations C(j+1) of a range of speeds of possible use of the said next aerodynamic configuration C(j+1) implemented by the flight management system, delimited by a minimum speed $V_{min}(j+1)$ and a maximum speed $V_{max}(j+1)$;
the automatic determination implemented by the flight management system comprising for each current segment covered S(i), a step of determination of an optimal speed $V_{OPT}(i)$ of the aircraft over the range of speeds of the next aerodynamic configuration C(j+1), said optimal speed $V_{OPT}(i)$ of the aircraft being dependent on at least one of the following: a predetermined deceleration strategy and on predetermined constraints inherent in a flight procedure or introduced by a pilot in his flight plan;
the display of changes comprising at least one of the following:
a first screen for displaying at least one of the following: a lateral navigation profile, a vertical descent profile as altitudes, as speeds each including pseudo-waypoints at each of which a change of aerodynamic configuration takes place, the geographical positions of the pseudo-waypoints varying as a function of a deceleration strategy chosen; and
a second screen for displaying a banner of possible speeds of use of at least one of the following: a selected aerodynamic configuration and of an optimized speed of extension of the aerodynamic configuration corresponding to a choice of deceleration strategy and an entered flight plan.

* * * * *